United States Patent
Nakagawa

(10) Patent No.: US 10,133,225 B2
(45) Date of Patent: Nov. 20, 2018

(54) IMAGE FORMING APPARATUS

(71) Applicant: KYOCERA Document Solutions Inc., Osaka (JP)

(72) Inventor: Tatsuya Nakagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/619,759

(22) Filed: Jun. 12, 2017

(65) Prior Publication Data
US 2018/0017918 A1    Jan. 18, 2018

(30) Foreign Application Priority Data

Jul. 13, 2016  (JP) .................................. 2016-138161

(51) Int. Cl.
| | |
|---|---|
| *G03G 15/00* | (2006.01) |
| *G03G 15/04* | (2006.01) |
| *H04N 1/032* | (2006.01) |
| *G03G 15/043* | (2006.01) |
| *G06K 15/12* | (2006.01) |

(52) U.S. Cl.
CPC ......... *G03G 15/5037* (2013.01); *G03G 15/04* (2013.01); *H04N 1/032* (2013.01); *G03G 15/043* (2013.01); *G06K 15/12* (2013.01)

(58) Field of Classification Search
CPC .................................................. G03G 15/5037
See application file for complete search history.

(56) References Cited

U.S. PATENT DOCUMENTS

| 7,979,011 B2 | 7/2011 | Fujihara et al. | |
|---|---|---|---|
| 2010/0129102 A1* | 5/2010 | Fujihara | G03G 15/065 |
| | | | 399/55 |

FOREIGN PATENT DOCUMENTS

| JP | H09-054487 A | 2/1997 |
|---|---|---|
| JP | 2010-054744 A | 3/2010 |

* cited by examiner

*Primary Examiner* — David M. Gray
*Assistant Examiner* — Andrew V Do
(74) *Attorney, Agent, or Firm* — Studebaker & Brackett PC

(57) ABSTRACT

An image forming apparatus includes a developing roller, a voltage applying part, a direct current correcting part and a correction switching part. The developing roller supplies a toner to an image carrier. The voltage applying part applies a superimposed voltage of an alternating current voltage and a direct current voltage to the developing roller. The direct current correcting part corrects the direct current voltage on the basis of variation of an alternating current flowing between the voltage applying part and the developing roller. The correction switching part switches the direct current voltage correcting part between an operating state and a non-operating state.

6 Claims, 5 Drawing Sheets

IMAGE FORMING APPARATUS

INCORPORATION BY REFERENCE

This application is based on and claims the benefit of priority from Japanese Patent application No. 2016-138161 filed on Jul. 13, 2016, the entire contents of which are incorporated herein by reference.

BACKGROUND

The present disclosure relates to an image forming apparatus including a development device supplying a toner to an image carrier.

Conventionally, in an image forming apparatus of a photographic manner, such as a copying machine or a printer, a development device supplying a toner to an image carrier by employing a high voltage is provided in order to form a toner image on the image carrier, such as a photosensitive drum, on which an electrostatic latent image on the basis of image data is formed.

The development device includes a developing roller having a rotating shaft parallel to the image carrier. The development device applies to the developing roller a high voltage obtained by superimposing an alternating current voltage and a direct current voltage on each other by a high voltage board, causes the developing roller to carry a charged toner, and electrically supplies the charged toner to the image carrier in a location in which the image carrier and the developing roller are close to each other. However, a surface of the developing roller is not always in complete parallel to a surface of the image carrier, and may have a runout of dozens of μm in size. Therefore, a close distance between the image carrier and the developing roller is varied in a rotation cycle of the developing roller. Even if a high voltage applied to the developing roller is stabilized, when the close distance between the image carrier and the developing roller is varied, an electric field between the image carrier and the developing roller is varied, and thereby, a toner supply amount is varied. For example, if the close distance between the image carrier and the developing roller is decreased, the toner supply amount is increased. On the other hand, if the close distance is increased, the toner supply amount is decreased. Thus, if the toner supply amount to the image carrier is varied in one rotation cycle of the developing roller, an uneven density in each rotation cycle of the developing roller may occur in a printed image.

In order to restrain this uneven density, direct current voltage correction is known to vary a direct current voltage in accordance with variation in the close distance between the image carrier and the developing roller. Specifically, if the close distance between the image carrier and the developing roller is varied, an alternating current between the image carrier and the developing roller is varied, and therefore, the alternating current is sensed by a high voltage board applying a high voltage to the developing roller and the direct current voltage correction is carried out to vary a direct current voltage in accordance with the variation of the alternating current. For example, by the direct current voltage correction, in a case where the alternating current is increased, the direct current voltage is lowered and, in a case where the alternating current is decreased, the direct current voltage is heightened, and thereby, the electric field between the image carrier and the developing roller is maintained constant.

For example, the development device detects a current of an alternating current component from a vibration bias voltage applied between the image carrier, such as the photosensitive drum, and a developer carrier, such as a developing sleeve, and varies a voltage of a direct current component in accordance with the detected value each time.

In addition, the image forming apparatus may include an electric discharge sensing circuit in order to measure an optimal alternating current voltage to be superimposed on a development bias of the development device. The electric discharge sensing circuit senses air discharge occurring between the image carrier and the developing roller. The development device is controlled in a cycle of measuring the optimal alternating current voltage so as to fix the direct current voltage to a constant value and to gradually heighten the alternating current voltage. The development device then applies the superimposed voltage as mentioned above to the developing roller while gradually heightening the alternating current. At this time, because the electric discharge sensing circuit senses the electric discharge between the image carrier and the developing roller, the optimal alternating current voltage is measured on the basis of the alternating current voltage when the electric discharge is sensed.

Alternatively, for example, the image forming apparatus may have the photosensitive drum, the developing roller arranged with a gap with respect to the photosensitive drum and connected to an alternating current voltage applying part, a detecting part detecting an occurrence of electric discharge between the developing roller and the photosensitive drum, and a controller controlling each component of the apparatus and recognizing an occurrence of electric discharge when an output of the detecting part is inputted.

However, in the case of correcting the direct current voltage constituting the high voltage as mentioned above, because the alternating current is increased at the time of rise of the alternating current voltage, the direct current voltage may be lowered. Therefore, the direct current voltage cannot be risen until the alternating current voltage is stabilized at a target voltage and the alternating current is stabilized, and as a result, the rise of the direct current voltage at the time of a printing start is delayed. Thus, in a cycle in which the direct current voltage does not rise, because a sufficient high voltage cannot be applied to the developing roller, the toner of a sufficient amount cannot be supplied to the image carrier, and therefore, an image having a thin toner at a tip end is printed.

Moreover, the development device may be composed of a touchdown development manner to include the developing roller supplying the toner to the image carrier, and a magnet roller supplying the toner to the developing roller. The development device of such a touchdown development manner has, as operating modes, a normal printing mode and a toner removing mode (a cleaning mode) collecting an old toner on the developing roller to the magnet roller at a timing between sheets. In this cleaning mode, in order to remove the toner from the developing roller, the high voltage (the alternating current voltage) applied to the developing roller is lowered. Therefore, when the cleaning mode is switched to the printing mode at a timing between sheets in continuous printing, there is a need to heighten the alternating current voltage again. However, as mentioned above, because the direct current voltage cannot be risen until the alternating current is stabilized, on an image printed immediately after switching to the printing mode, the toner at the tip end part becomes thin.

In addition, in the image forming apparatus including the electric discharge sensing circuit as mentioned above, in order to measure the optimal alternating current voltage to be superimposed on the development bias, the development device applies the superimposed voltage to the developing roller while gradually heightening the alternating current voltage. However, if the alternating current voltage is heightened, the direct current voltage is controlled so as to be lowered by the direct current voltage correction as mentioned above. It is feared that the electric discharge sensing circuit mistakenly senses such variation of the direct current voltage as air discharge, in spite of the fact that such air discharge does not occur between the image carrier and the developing roller.

SUMMARY

In accordance with the present disclosure, an image forming apparatus includes a developing roller, a voltage applying part, a direct current correcting part and a correction switching part. The developing roller supplies a toner to an image carrier. The voltage applying part applies a superimposed voltage of an alternating current voltage and a direct current voltage to the developing roller. The direct current correcting part corrects the direct current voltage on the basis of variation of an alternating current flowing between the voltage applying part and the developing roller. The correction switching part switches the direct current voltage correcting part between an operating state and a non-operating state.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
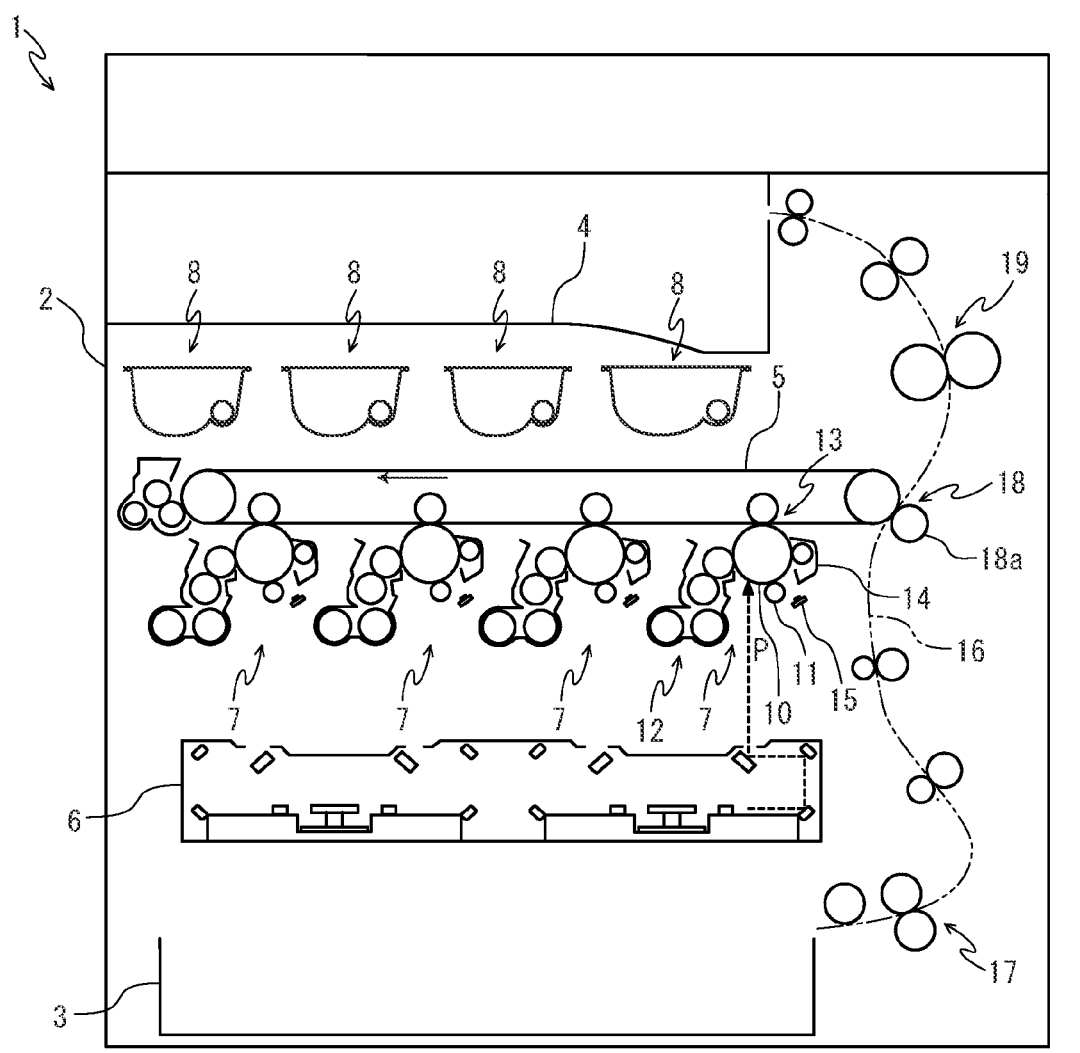
FIG. 1 is a sectional view schematically showing a configuration of a color printer according to an embodiment of the present disclosure.

First, an entire configuration of a color printer (an image forming apparatus) according to an embodiment of the present disclosure will be described with reference to FIG. 1. Hereinafter, for convenience of description, it will be described so that the front side of the color printer is positioned at the near side on a paper sheet of FIG. 1.

The color printer 1 includes a roughly box-formed printer body 2. In a lower part of the printer body 2, a sheet feeding cartridge 3 storing sheets (recording mediums) is provided and, in an upper part of the printer body 2, an ejected sheet tray 4 is provided.

At a central part of the printer body 2, an intermediate transferring belt 5 is windingly stretched among a plurality of rollers in left and right directions. At a lower side of the intermediate transferring belt 5, an exposure device 6 composed of a laser scanning unit (LSU) is provided. Along a lower face side of the intermediate transferring belt 5, four image forming parts 7 are provided for respective toner colors (for example, four colors of yellow, cyan, magenta and black). Each image forming part 7 includes a rotatably photosensitive drum 10 (an image carrier). At the periphery of the photosensitive drum 10, a charging device 11, a development device 12, a primary transferring part 13, a cleaning device 14, and a static eliminator 15 are disposed in a sequential order of a primary transferring process. At an upper side of the development device 12, toner containers 8 corresponding to respective image forming parts 7 are provided for the respective toner colors (for example, four colors of yellow, cyan, magenta and black).

At a right side part in the printer body 2, a conveying path 16 of the sheet is provided in upward and downward directions. At an upstream end of the conveying path 16, a sheet feeder 17 is provided. At a middle stream part of the conveying path 16, a secondary transferring part 18 is provided at a right end side of the intermediate transferring belt 5. The secondary transferring part 18 is composed of a part of a right end side of the intermediate transferring belt 5 and a secondary transferring roller 18a. At a downstream part of the conveying path 16, a fixing device 19 is provided and, at a downstream end of the conveying path 16, a sheet ejecting port is provided.

Next, an image forming operation of the color printer 1 as described above will be described. In the color printer 1, image data is inputted and a printing start is directed from an external computer or the like. In each image forming part 7, the photosensitive drum 10 is electrically charged by the charging device 11, and then, exposed on the basis of the image data by the exposure device 6, and thereby, an electrostatic latent image is formed on the photosensitive drum 10. The electrostatic latent image on the photosensitive drum 10 is developed for a toner image of each color by the development device 12. The toner image on the photosensitive drum 10 is primarily transferred to a surface of the intermediate transferring belt 5 by the primary transferring part 13. By the four image forming parts 7, the operation described above is repeated, and thereby, a toner image of full color (a color tone image) is formed on the intermediate transferring belt 5. The color toner image is supplied to a secondary transferring part 18 at a predetermined secondary transfer timing by rotation of the intermediate transferring belt 5.

On the other hand, a sheet stored in the sheet feeding cartridge 3 or a manual bypass tray (not shown) is picked up by the sheet feeder 17, and then, converted on the conveying path 16. Subsequently, the sheet on the conveying path 16 is conveyed to the secondary transferring part 18 at the predetermined secondary transfer timing described above. In the secondary transferring part 18, the color toner image on the intermediate transferring belt 5 is secondarily transferred to the sheet. The sheet having the secondarily transferred color toner image is conveyed on the conveying path 16 to the downstream side, the color toner image is fixed to the sheet by the fixing device 19, and then, the sheet is ejected from the sheet ejecting port to the ejected sheet tray 4.

Next, the development device 12 of each image forming part 7 will be described with reference to FIG. 2. Incidentally, since the development devices 12 of the respective image forming parts 7 have similar configurations, one development device 12 will be described hereinafter.

Figure 2:
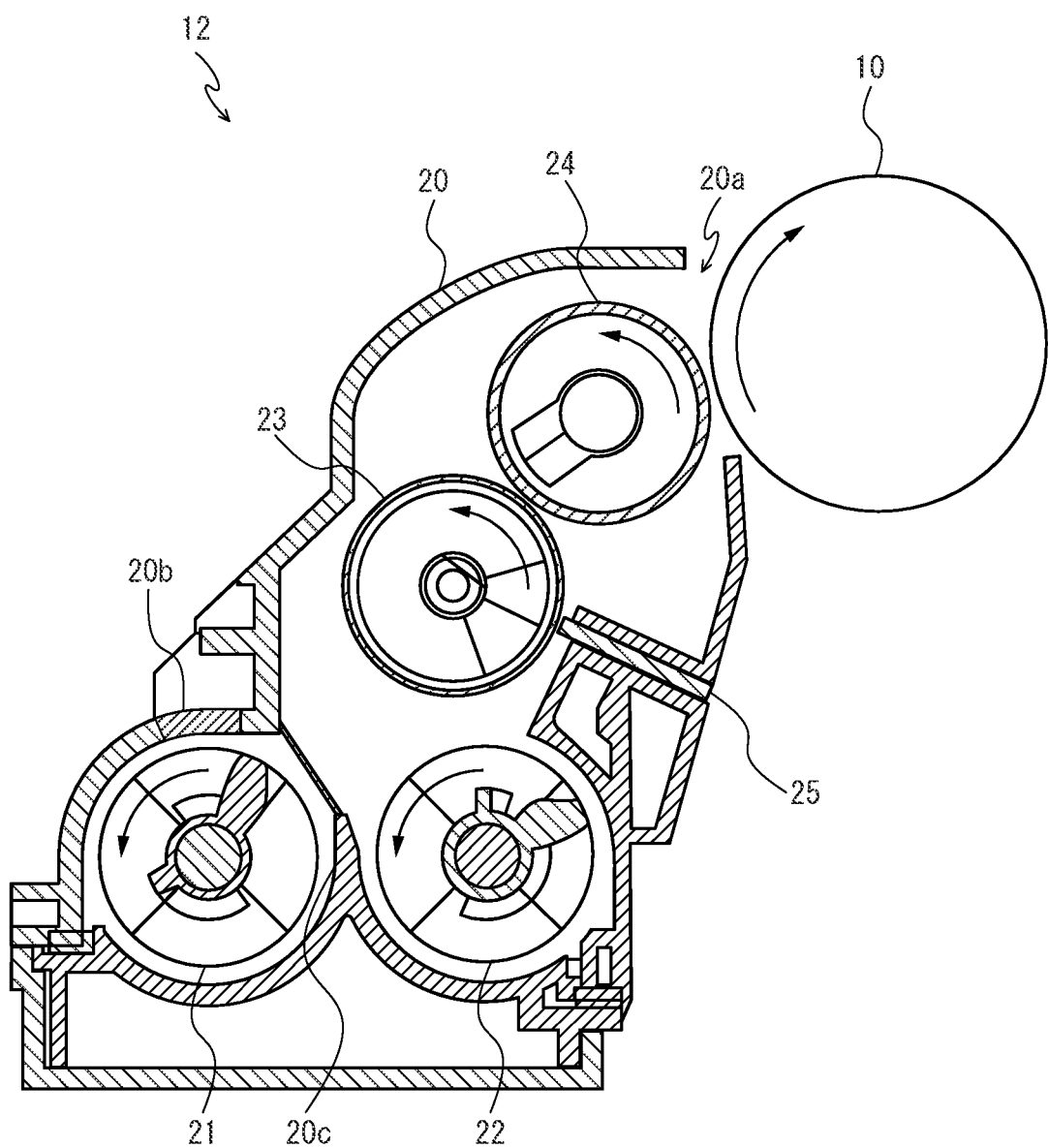
FIG. 2 is a sectional view showing a development device in the color printer according to the embodiment of the present disclosure.

As shown in FIG. 2, the development device 12 includes, in a casing 20, an agitating roller 21, a conveying roller 22, a magnet roller 23, a developing roller 24 and a restraining member 25.

The casing 20 houses, as a toner, for example, a two-component developer composed of a magnetic toner and a carrier. The casing 20 has an aperture 20a at an upper right part thereof and is arranged so that the aperture 20a faces to the photosensitive drum 10. The casing 20 has a supply port 20b at a lower left part thereof and is connected to the tone container 8 corresponding to the development device 12 via the supply port 20b to receive replenishment of toner from the toner container 8. At a bottom part of the casing 20, a partition 20c extending in forward and backward directions is erected. Incidentally, the partition 20c is formed to be shorter than the agitating roller 21 and the conveying roller 22 in the forward and backward directions and arranged so that both ends in the forward and backward directions are arranged with a gap with respect to an interior surface of the casing 20.

The agitating roller 21 and the conveying roller 22 are rotating members having respective rotating shafts extending in the forward and backward directions, are disposed to be parallel to each other at both sides of the partition 20c at the bottom part of the casing 20, and are rotatably mounted to the casing 20. Incidentally, the agitating roller 21 is provided in the vicinity of the supply port 20b of the casing 20.

The agitating roller 21 is rotated to agitate and to frictionally charge the toner, and further, to supply the toner to the conveying roller 22 via one gap of the partition 20c of the casing 20. The conveying roller 22 is rotated to convey the toner to the magnet roller 23. In addition, the conveying roller 22 is rotated to agitate and to return the toner returned from the magnet roller 23 to the agitating roller 21 via the other gap of the partition 20c. That is, the agitating roller 21 and the conveying roller 22 circulate the toner.

The magnet roller 23 carries the toner to be supplied to the developing roller 24 and is a rotating member having a rotating shaft extending in the forward and backward directions. The magnet roller 23 is disposed at an upper side of the conveying roller 22 at an interval from the conveying roller 22 and is rotatably mounted to the casing 20. Incidentally, the magnet roller 23 is disposed so that an axial direction thereof is parallel to an axial direction of the developing roller 24.

The magnet roller 23 is configured to carry the toner on a surface thereof. For example, the magnet roller 23 has a magnet inside thereof and forms a magnetic brush of the toner on the surface by magnetic force lines of the magnet. The magnet roller 23 is configured to convey the toner to the developing roller 24 at the time of image forming (in a printing mode as described later), or alternatively, to collect the toner from the developing roller 24 at the time of toner collection (in a cleaning mode as described later). For example, in the magnet roller 23, at the time of image forming, a bias voltage is applied all over an axial direction thereof to generate the electric field required for toner conveyance at a space between the magnetic roller 23 and the developing roller 24 or in the vicinity of the developing roller 24. The toner carried by the magnet roller 23 is moved to a side of the developing roller 24 by this electric field. In addition, the magnet roller 23 removes and collects, at the time of toner collection, the toner being not developed and still remained in the developing roller 23 by the magnetic brush formed on the surface of the magnet roller 23.

The developing roller 24 carries the toner to be supplied to the photosensitive drum 10 and is a rotating member having a rotating shaft extending in the forward and backward directions. The developing roller 24 is disposed at an upper side of the magnet roller 23 so that a rotating surface thereof faces to that of the magnet roller 23 and is rotatably mounted to the casing 20. In addition, the developing roller 24 is disposed in the vicinity of the aperture 20a of the casing 20 and a rotating surface thereof faces to that of the photosensitive drum 20 via the aperture 20a. Incidentally, the developing roller 24 is disposed so that an axis direction thereof is parallel to an axial direction of the photosensitive drum 10.

The developing roller 24 is configured to carry the toner conveyed from the magnet roller 23 at a space between the magnet roller 23 and the developing roller 24 or in the vicinity of the developing roller 24. For example, in the developing roller 24, a bias voltage is applied all over an axial direction thereof and, on a surface thereof, a uniform toner layer is thereby formed at a predetermined layer thickness. The bias voltage of the developing roller 24 has a predetermined potential difference from a bias voltage of the magnet roller 23, the toner amount conveyed to the developing roller 24 is adjusted due to this potential difference, and when the toner layer on the surface of the developing roller 24 reaches the predetermined layer thickness, the conveyed toner amount is saturated.

The restraining member 25 is an elongated plate-shaped member in the forward and backward directions and is composed of, for example, an ear cutting blade or the like. The restraining member 25 is disposed at an upstream side from a facing position of the magnet roller 23 and the developing roller 24 in a rotation direction of the magnet roller 23. The restraining member 25 is provided so that a longitudinal direction thereof is parallel to the axial direction of the magnet roller 23, one end in a short direction thereof is fixed to a right side interior surface of the casing 20, and the other end in the short direction thereof has a slight gap with respect to the surface of the magnet roller 23.

Figure 3:
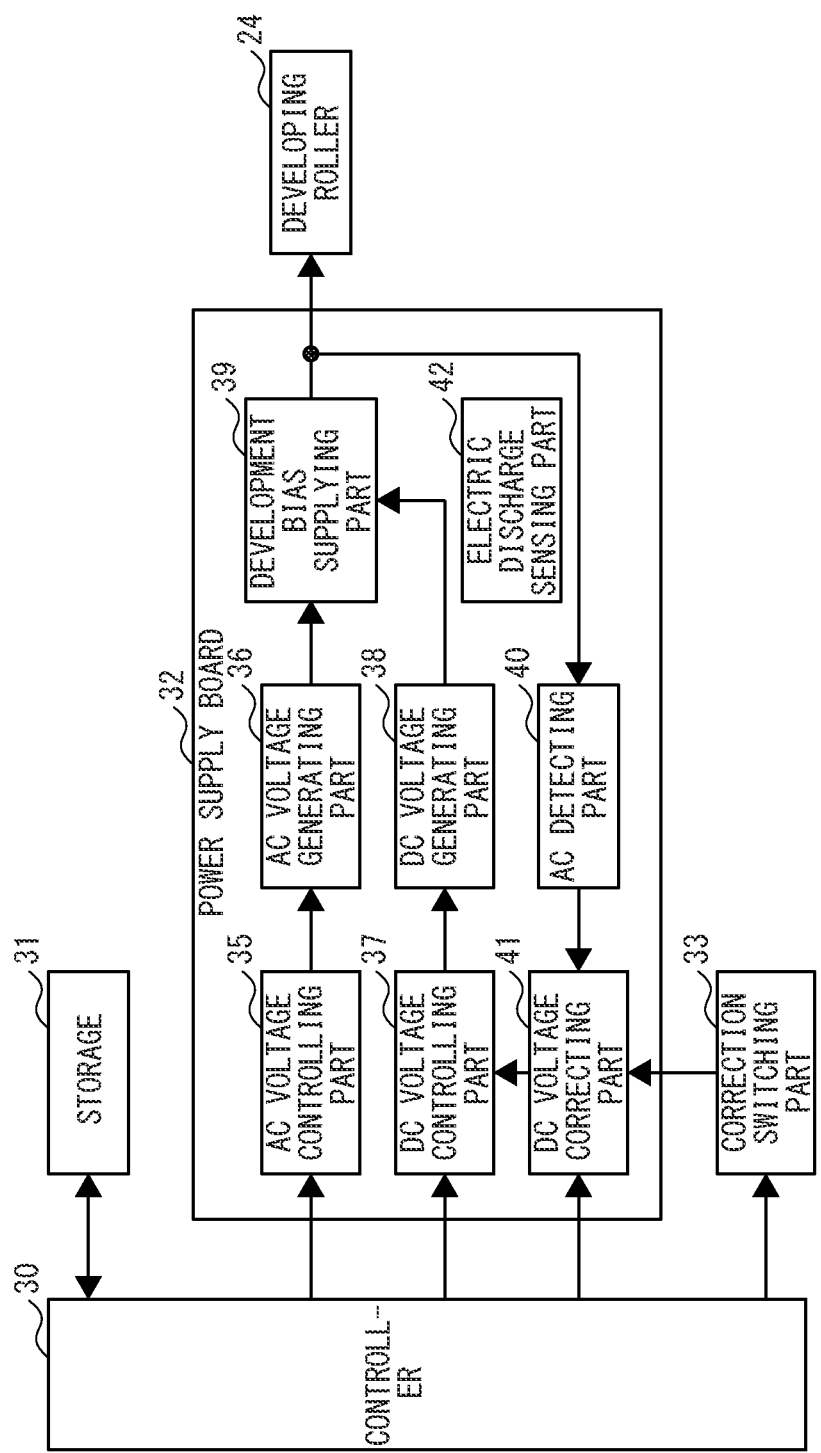
FIG. 3 is a block diagram showing a control system of the development device in the color printer according to the embodiment of the present disclosure.

Next, an electrical configuration at the periphery of the development device 12 of the color printer 1 will be described with reference to FIG. 3. The color printer 1 includes a controller 30 and a storage 31 inside of the printer body 2. Incidentally, the color printer 1 has, as operating modes of the development device 12, the normal printing mode, a toner removing mode (the cleaning mode) collecting an old toner on the developing roller 24 to the magnet roller 23 at a timing between sheets, and a development bias measuring mode measuring an optimal development alternating current voltage with respect to the developing roller 24.

The controller 30 is composed of a CPU or the like, is connected to the storage 31 and is connected to a power supply board 32, a correction switching part 33 and other components included in the color printer 1, and is configured to be able to control each components. The power supply board 32 includes an alternating current voltage controlling part 35, an alternating current voltage generating part 36, a direct current voltage controlling part 37, a direct current voltage generating part 38, a development bias supplying part 39, an alternating current detecting part 40, a direct current voltage correcting part 41 and an electric discharge sensing part 42.

The storage 31 is composed of a ROM, a RAM and others to store programs and data required to carry out an image forming process or other various functions of the color printer 1. The controller 30 is configured to control each components of the color printer 1 on the basis of the control programs and control data stored in the storage 31. In the storage 31, for example, optimal values (effective values) of the development alternating current voltage and the development direct current voltage are stored. Incidentally, although in FIG. 3, the correction switching part 33, the alternating current voltage controlling part 35, the direct current voltage controlling part 37 and the direct current voltage correcting part 41 are illustrated to be separate from the storage 31, these components may be configured as the programs stored in the storage 31 and executed by the controller 30.

The power supply board 32 is configured to supply power to each component included in the color printer 1. Hereinafter, an example of supplying a development bias to the developing roller 24 of the development device 12 will be described, and descriptions of other components are omitted. In the power supply board 32, the alternating voltage controlling part 35, the alternating current voltage generating part 36, the direct current voltage controlling part 37, the direct current voltage generating part 38 and the development bias supplying part 39 function as a voltage applying part supplying the development bias to the developing roller 24.

The alternating current voltage controlling part instructs generation of the development alternating current voltage in the printing mode, instructs generation of a cleaning alternating current voltage in the cleaning mode, and transmits to the alternating current voltage generating part 36 an alternating current voltage generation signal instructing generation of an electric discharge sensing alternating current voltage in the a development bias measuring mode. The alternating current voltage controlling part 35 may instruct generation of a voltage value of the development alternating current voltage, the cleaning alternating current voltage or the electric discharge sensing alternating current voltage by the alternating current voltage generation signal. In addition, the alternating current voltage controlling part 35 transmits to the alternating current voltage generating part 36 an alternating current voltage stop signal instructing stop of generation of the alternating current voltage in non-operating.

Incidentally, in the cleaning mode, since there is no need to cause the developing roller 24 to carry the toner and there is no need to set the development bias to be high, the cleaning alternating current voltage is set to be lower than the development alternating current voltage. The electric discharge sensing alternating current voltage is controlled so as to gradually heighten from a voltage value causing no electric discharge to occur in the developing roller 24 (for example, 0 V or any other low voltage value) in the development bias measuring mode (in the cycle of measuring the optimal value of the development alternating current voltage).

The alternating current voltage generating part 36 is connected to a power source (not shown) to generate the development alternating current voltage, the cleaning alternating current voltage and the electric discharge sensing alternating current voltage in accordance with the alternating current voltage generation signal from the alternating current voltage controlling part 35 and to supply the generated alternating current voltage to the development bias supplying part 39. Alternatively, the alternating current voltage generating part 36 stops generation and supply of the alternating current voltage in accordance with the alternating current voltage stop signal from the alternating current voltage controlling part 35.

The direct current voltage controlling part 37 instructs generation of the development direct current voltage in the printing mode, instructs generation of a cleaning direct current voltage in the cleaning mode, and transmits to the direct current voltage generating part 38 an direct current voltage generation signal instructing generation of an electric discharge sensing alternating current voltage in the development bias measuring mode. The direct current voltage controlling part 37 may instruct voltage values of the development direct current voltage, the cleaning direct current voltage and the electric discharge sensing direct current voltage by the direct current voltage generation signal. The direct current voltage controlling part 37 may instruct, in a case of having received a correction signal from the direct current voltage correcting part 41, the voltage values corrected on the basis of the correction signal with respect to the development direct current voltage and the cleaning direct current voltage. In addition, the direct current voltage controlling part 37 transmits to the direct current voltage generating part 38 a direct current voltage stop signal instructing stop of generation of the direct current voltage in non-operating.

Incidentally, although the voltage values as bases of the development direct current voltage, the cleaning direct current voltage and the electric discharge sensing direct current voltage may be set at a constant voltage value (for example, 50 V), these values may be individually set in accordance with characteristics of each color printer 1. The development direct current voltage and the cleaning direct current voltage may be corrected from the base voltage value by the direct current voltage correcting part 41 in accordance with variation of the direct current voltage that applied to the magnet roller 23 or variation of the alternating current voltage applied to each roller (for example, magnet roller 23 or developing roller 24). In the development bias measuring mode, since the direct current voltage correcting 41 is set to a non-operating state as described later, the electric discharge sensing direct current voltage may be maintained at a constant voltage value without being corrected by the direct current voltage correcting part 41 irrespective of the alternating current between the development bias supplying part 39 and the developing roller 24.

The direct current voltage generating part 36 is connected to the power source (not shown) to generate the development direct current voltage, the cleaning direct current voltage and the electric discharge sensing direct current voltage in accordance with the direct current voltage generation signal from the direct current voltage controlling part 37 and to supply the generated direct current voltage to the development bias supplying part 39. Alternatively, the direct current voltage generating part stops generation and supply of the direct current voltage in accordance with the direct current voltage stop signal from the direct current voltage controlling part 37.

The development bias supplying part 39 superimposes the alternating current voltage supplied from the alternating current voltage generating part 36 and the direct current voltage supplied from the direct current voltage generating part 38 on each other and supplies a superimposed voltage as the development bias to the developing roller 24. Incidentally, although the development bias supplying part 39 applies to the development roller 24 the superimposed voltage based on the electric discharge sensing alternating current voltage while the electric discharge sensing alternating current voltage is gradually heightened in the development bias measuring mode, the voltage may be superimposed every predetermined time or every predetermined rotation of the developing roller 24.

The alternating current detecting part 40 detects an alternating current component (an alternating current value) from the current flowing between the development bias supplying part 39 and the developing roller 24 when the development bias (the superimposed voltage) is supplied from the development bias supplying part 39 to the developing roller 24. Although the embodiment is described as to an example in which the alternating current detecting part 40 is provided on the power supply board 32, the alternating current detecting part 40 may be provided to be separate from the power supply board 32.

The direct current voltage correcting part 41 transmits the correction signal to the direct current voltage controlling part 37 on the basis of variation of the alternating current value detected by the alternating current detecting part 40 so as to correct the direct current voltage generated by the direct current voltage generating part 38. For example, the direct current voltage correcting part 41 generates the correction signal so as to lower the direct current voltage in a case where the alternating current value is increased, or alternatively, to heighten the direct current voltage in a case where the alternating current value is decreased.

Incidentally, the direct current correcting part 41 is set to an operating state in a case of receiving an operating signal from the correction switching part 33 to execute generation and transmission of the correction signal based on the alternating current value, or alternatively, is set to the non-operating state in a case of receiving a non-operating signal from the correction switching part 33 to stop generation and transmission of the correction signal based on the alternating current value. Although the embodiment is described as to an example in which the direct current voltage correcting part 41 is provided on the power supply board 32, the direct current voltage correcting part 41 may be provided to be separate from the power supply board 32.

The electric discharge sensing part 42 senses air discharge occurring the photosensitive drum 10 and the developing roller 24, for example, senses a weak discharge current of several μA flowing between the photosensitive drum 10 and the developing roller 24. The electric discharge sensing part 42 transmits a sensing signal to the controller 30 in a case of being sensed the electric discharge as described above. Although the embodiment is described as to an example in which the electric discharge sensing part 42 is provided on the power supply board 32, the electric discharge sensing part 42 may be provided to be separate from the power supply board 32.

For example, the electric discharge sensing part 42 is configured to compare the voltage value obtained by converting the current flowing the developing roller 23 when no electric discharge occurs and the voltage value obtained by converting the current flowing the developing roller 23 when electric discharge occurs and to decide on the basis of a difference (a variation component) between these voltage values whether or not electric discharge occurs. Incidentally, the electric discharge sensing part 42 is not limited to such a configuration, and any other configuration may be employed as long as it is possible to sense air discharge occurring between the photosensitive drum 10 and the developing roller 24.

In addition, the electric discharge sensing part operates in the development bias measuring mode to sense electric discharge occurring between the photosensitive drum 10 and the developing roller 24 while the superimposed voltage based on the gradually heightening electric discharge sensing alternating current voltage is applied to the developing roller 24. In the development bias measuring mode, by the controller 30, the optimal value of the development alternating current voltage actualizing a situation, where no air discharge occurs and a development property is heightened, is measured on the basis of the electric discharge sensing alternating current voltage at the time point when the electric discharge sensing part 42 senses electric discharge.

The correction switching part 33 switches the operating state and the non-operating state of the direct current voltage correcting part 41 in accordance with a predetermined switching condition. For example, the correction switching part 33 firstly sets the direct current voltage correcting part 41 to the non-operating state. Afterwards, the correction switching part 33 switches the direct current voltage correcting part 41 to the non-operating state by setting as the predetermined switching condition a time when, in a case where the development alternating current voltage is generated by the alternating current voltage generating part 36 in the printing mode, the generated alternating current voltage is heightened and is stabilized at the development alternating current voltage and the alternating current flowing between the development bias supplying part 39 and the developing roller 24 becomes a stabilized current. In addition, the correction switching part 33 switches the direct current voltage correcting part 41 to the non-operating state by setting as the predetermined switching condition a time when printing is completed (the printing mode is set to OFF). Further, the correction switching part 33 switches the direct current voltage correcting part 41 to the non-operating state by setting as the predetermined switching condition a time when the operating mode is switched from the printing mode to the cleaning mode at a timing between sheets when continuous printing is carried out.

Figure 4:
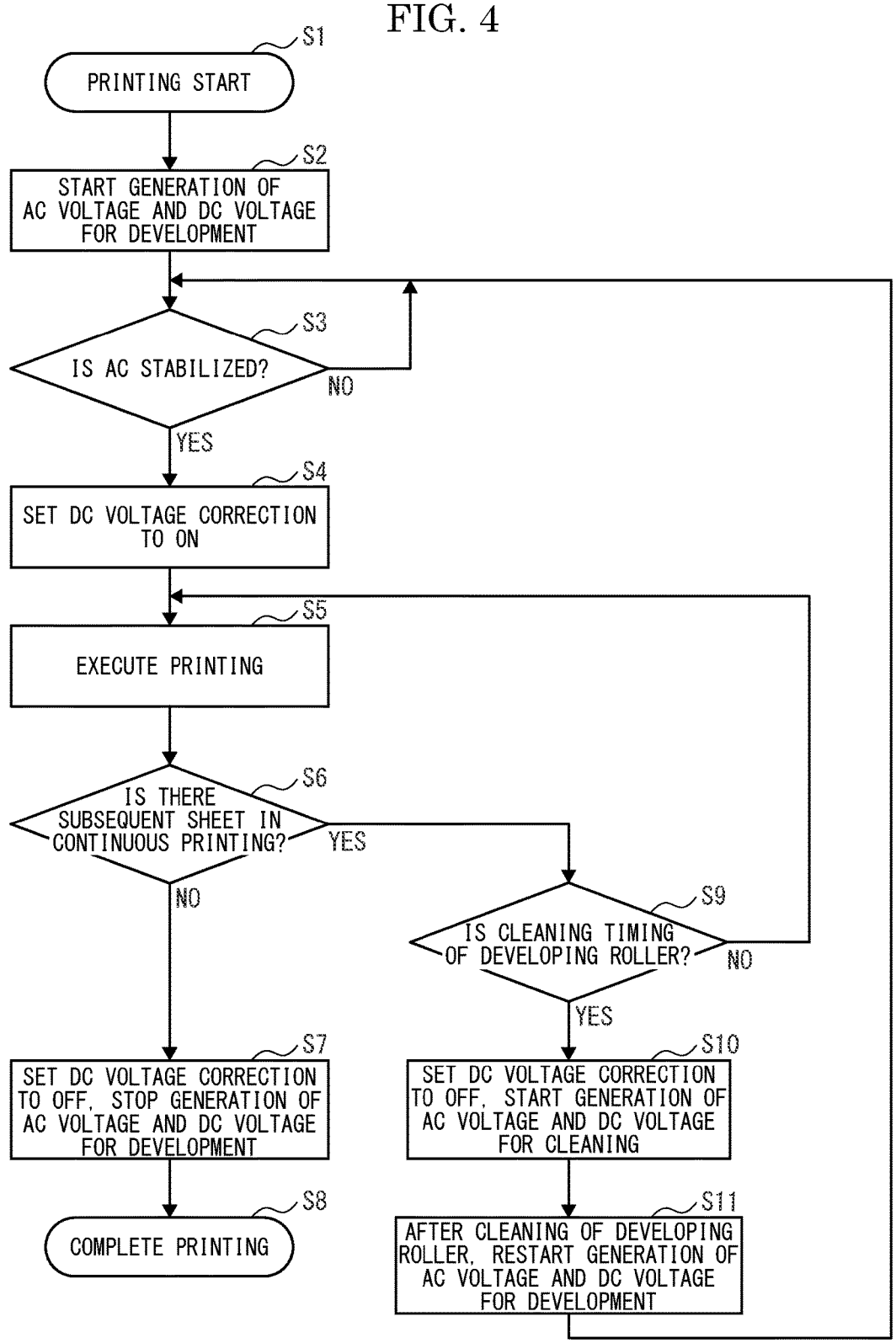
FIG. 4 is a flowchart showing operations of control of an alternating current voltage and a direct current voltage of a development bias in association with printing and correction switching of the direct current voltage in the color printer according to the embodiment of the present disclosure.

Next, operations of the alternating current voltage controlling part 35, the direct current voltage controlling part 37 and the correction switching part 33 when printing is carried out by the color printer 1 will be described with reference to the flowchart of FIG. 4.

First, when the printing start is directed and the operating mode is switched to the printing mode (step S1), the alternating current voltage generating part 36 and the direct current voltage generating part 38 are respectively controlled by the alternating current voltage controlling part 35 and the direct current voltage controlling part 37 to start generation of the development alternating current voltage and the development direct current voltage (step S2). The development bias supplying part 39 generates the superimposed voltage of the alternating current voltage generated by the alternating current voltage generating part 36 and the direct current voltage generated by the direct current voltage generating part 38 and applies the superimposed voltage to the developing roller 24.

The correction switching part 33 decides whether or not the alternating current voltage generated by the alternating current voltage generating part 36 is stabilized at the development alternating current voltage and the alternating current flowing between the development bias supplying part 39 and the developing roller 24 becomes the stabilized current (step S3).

Incidentally, the correction switching part 33 grasps a first stabilization timing, after generation of the development alternating current voltage by the alternating current voltage generating part 36 is started by starting printing, when the generated alternating current voltage is stabilized at the development alternating current voltage and the alternating current flowing the development bias supplying part 39 and the developing roller 24 becomes the stabilized current. The first stabilization timing may be set as a predetermined preparation time from a generation start of the development alternating current voltage by the alternating current voltage generating part 36 and it may be decided on the basis of the time counted by a timer whether or not the predetermined preparation time is elapsed. Alternatively, the first stabilization timing may be set on the basis of an operating signal from other component (for example, an ON/OFF signal of a laser light irradiating the photosensitive drum 10 by the exposure device 6) requiring the printing process (image forming process).

In a case where the alternating current flowing the development bias supplying part 39 and the developing roller 24 becomes the stabilized current (step S3: YES), the correction switching part 33 switches the direct current voltage correcting part 41 to the operating state (step S4). At this time, since the alternating current detected by the alternating current detecting part 40 is stabilized, the direct current voltage correcting part 41 does not output the correction signal so as to lower the direct current voltage and the direct current voltage generating part 38 generates the development direct current voltage without any delay.

The development bias supplying part 39 then applies to the developing roller 24 the development bias obtained by superimposing the development alternating current voltage and the development direct current voltage on each other, and therefore, the development process by the development device 12 becomes possible and the printing process is executed (step S5).

In addition, the controller 30 decides the presence or absence of a SUBSEQUENT SHEET to be continuously printed at a timing between sheets when printing of one sheet is completed (step S6).

In a case where there is no subsequent sheet to be continuously printed (step S6: NO), the printing mode is set to OFF. Accordingly, the correction switching part 33 switches the direct current voltage correcting part 41 to the non-operating state, and the alternating current voltage controlling part 35 and the direct current voltage controlling part 37 stops generation of the development alternating current voltage and the development direct current voltage by the alternating current voltage generating part 36 and the direct current voltage generating part 38, respectively (step S7). Afterwards, printing is completed (step S8).

On the other hand, in a case where there is a subsequent sheet to be continuously printed (step S6: YES), the controller 30 decides whether or not a cleaning timing of removing (cleaning) the toner accumulated on the surface of the developing roller 24 is reached (step S9). Incidentally, the cleaning timing is set at a timing subsequent to the printing start or the development bias applying start and the last cleaning every predetermined number of sheets or predetermined time.

Subsequently, in a case where no cleaning timing is reached (step S9: NO), the operation is shifted to printing execution of a subsequent sheet (step S5).

On the other hand, in a case where the cleaning timing is reached (step S9: YES), the operating mode is switched from the printing mode to the cleaning mode. Accordingly, the correction switching part 33 switches the direct current voltage correcting part 41 to the non-operating state, and the alternating voltage generating part 36 and the direct current voltage generating part 38 are respectively controlled by the alternating current voltage controlling part 35 and the direct current voltage controlling part 37 to start generation of the cleaning alternating current voltage and the cleaning direct current voltage (step S10). Here, since the cleaning alternating current voltage is set to be lower than the printing alternating current voltage, the alternating current voltage generating part 36 lowers the generated alternating current voltage.

Afterwards, when the alternating current voltage and the direct current voltage respectively generated by the alternating current voltage generating part 36 and the direct current voltage generating part 38 becomes the cleaning alternating current voltage and the cleaning direct current voltage, cleaning of the developing roller 24 is executed and the old toner on the developing roller 24 is removed. When cleaning of the developing roller 24 is completed (when a predetermined time set for cleaning is elapsed), the operating mode is switched from the cleaning mode to the printing mode. Accordingly, the alternating current voltage generating part 36 and the direct current voltage generating part 38 are respectively controlled by the alternatively current voltage controller 35 and the direct current voltage controlling part 37 to restart generation of the development alternating current voltage and the development direct current voltage (step S11). At this time, the alternating current voltage generating part 36 raises the generated alternating current voltage from the cleaning alternating current voltage to the development alternating current voltage.

Subsequently, the correction switching part 33, in the same manner as that described above, decides whether or not the alternating current voltage generated by the alternating current voltage generating part 36 is stabilized at the development alternating current voltage and the alternating current flowing the development bias supplying part 39 and then the developing roller 24 becomes the stabilized current (step S3). Incidentally, the correction switching part 33 grasps a second stabilization timing, after generation of the development alternating current voltage by the alternating current voltage generating part 36 is restarted after cleaning of the developing roller 24, the generated alternating current voltage is stabilized at the development alternating current voltage and the alternating current voltage flowing between the development bias supplying part 39 and the developing roller 24 becomes the stabilized current.

Afterwards, when the alternating current flowing the development bias supplying part 39 and the developing roller 24 becomes the stabilized current (step S3: YES), in the same manner as that described above, the correction switching part 33 switches the direct current voltage correcting part 41 to the operating state (step S4). Accordingly, the development process by the development device 12 becomes possible and the printing process of a subsequent sheet is executed (step S5).

Figure 5:
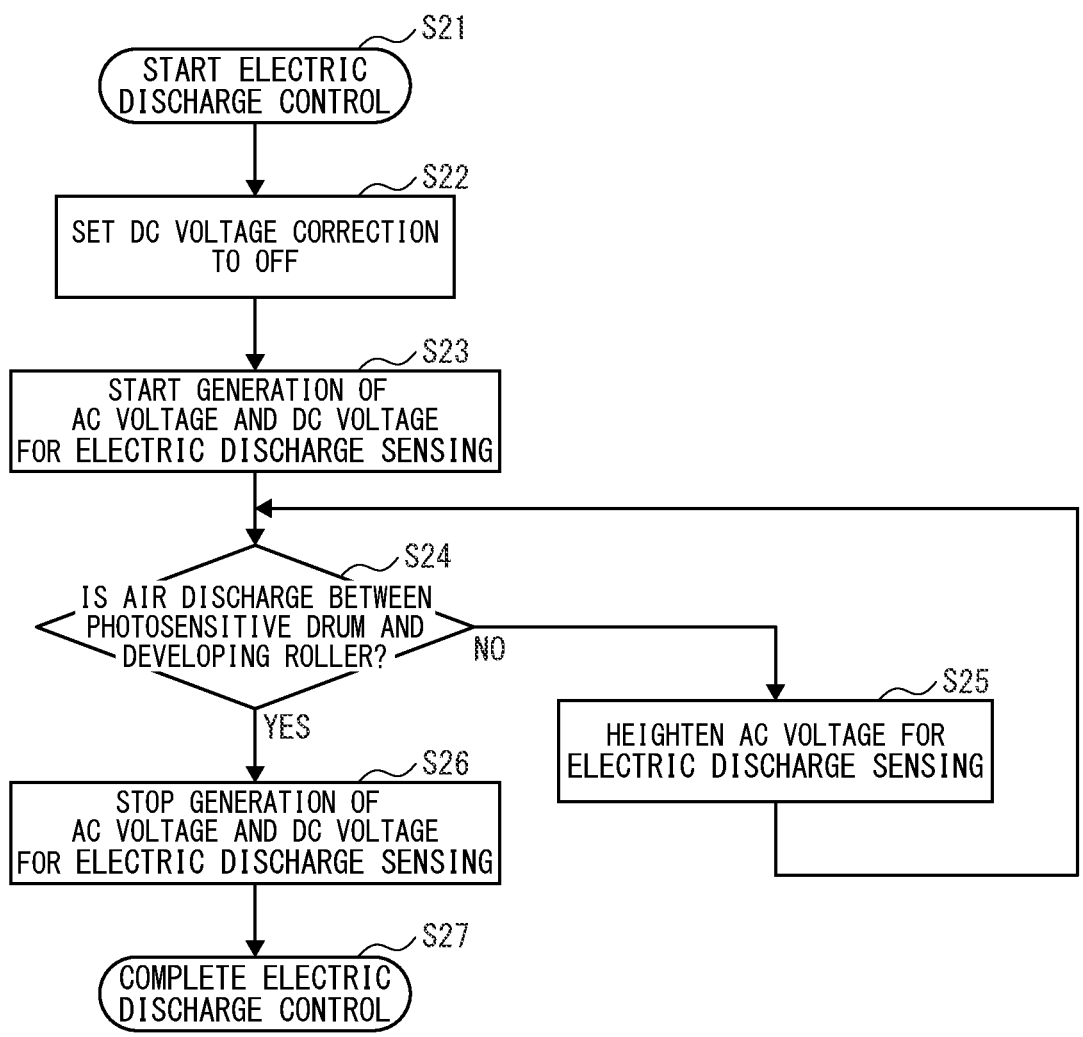
FIG. 5 is a flowchart showing operations of electric discharge sensing of a developing roller and correction switching of the direct current voltage when measuring an optimal development alternating current voltage with respect to the developing roller in the color printer according to the embodiment of the present disclosure.

Next, operations of the electric discharge sensing part 42 and the correction switching part 33 when measuring the optimal development alternating current voltage with respect to the developing roller 24 will be described with reference to the flowchart of FIG. 5.

In the color printer 1, as a predetermined timing, at the time of startup is carried out or when a predetermined time is elapsed subsequent to startup, or alternatively, every predetermined time or every predetermined number of sheets subsequent to the printing start, in order to measure the optimal development alternating current voltage of the developing roller 24, the operating mode is switched to the development bias measuring mode, and then, electric discharge sensing by the electric discharge sensing part 42 is started (step S21).

When the operating mode is switched to the development bias measuring mode, the correction switching part 33 switches the direct current voltage correcting part 41 to the non-operating state (step S22). In the development bias measuring mode, the alternating current voltage generating part 36 and the direct current voltage generating part 38 are respectively controlled by the alternating current voltage controlling part 35 and the direct current voltage controlling part 37 to start generation of the electric discharge sensing alternating current voltage and the electric discharge sensing direct current voltage (step S23).

Subsequently, the development bias supplying part generates the superimposed voltage of the electric discharge sensing alternating current voltage and the electric discharge sensing direct current voltage, and then, applies the superimposed voltage to the developing roller 42. The electric discharge sensing part 42 senses whether or not electric discharge occurs between the photosensitive drum 10 and the developing roller 24 (step S24).

In a case where this electric discharge does not occur (step S24: NO), the alternating current voltage controlling part 35 heightens the electric discharge sensing alternating current voltage generated by the alternating current voltage generating part 36 (step S25). Afterwards, applying of the superimposed voltage of the heightened electric discharge sensing alternating current voltage and the constant electric discharge sensing direct current voltage to the developing roller 24 and electric discharge sensing by the electric discharge sensing part 42 (step S24) are repeated.

On the other hand, in a case where electric discharge occurs (step S24: YES), the optimal value of the development alternating current voltage is measured by the controller 30 on the basis of the electric discharge sensing alternating current voltage at the time when the electric discharge sensing part 42 senses electric discharge. In addition, the development bias measuring mode is set to OFF, and then, the alternating current voltage generating part 36 and the direct current voltage generating part 38 are respectively controlled by the alternating current voltage controlling part 35 and the direct current voltage controlling part 37 to stop generation of the electric discharge sensing alternating current voltage and the electric discharge sensing direct current voltage (step S26). Subsequently, electric discharge sensing control is completed (step S27).

Incidentally, even when the operating mode is switched from the printing mode to the development bias measuring mode while continuous printing is executed, the operation is carried out in the same manner as the operations as an example described above. Here, after electric discharge sensing control is completed (step S27), the operating mode is switched from the development bias measuring mode to the printing mode. In such a case, similarly to an example of the flowchart in FIG. 4, the correction switching part 33 switches the direct current voltage correcting part 41 to the operating mode at a timing when the alternating current voltage generated by the alternating current voltage generating part 36 is stabilized at the development alternating current voltage and the alternating current flowing between the development bias supplying part 39 and the developing roller 24 becomes the stabilized current.

According to the embodiment, as described above, the color printer 1 includes the developing roller 24 supplying the toner to the photosensitive drum 10 (the image carrier) and the voltage applying part (the alternating current voltage controlling part 35, the alternating current voltage generating part 36, the direct current voltage controlling part 37, the direct current voltage generating part 38 and the development bias supplying part 39) applying the superimposed voltage of the alternating current voltage and the direct current voltage to the developing roller 24. Further, the color printer 1 includes the direct current voltage correcting part 41 correcting the direct current voltage on the basis of variation of the alternating current flowing between the voltage applying part (the development bias supplying part 39) and the developing roller 24, and the correction switching part 33 switching the direct current voltage correcting part 41 between the operating state and the non-operating state.

In this manner, in the color printer 1, since the direct current voltage correcting part 41 corrects the direct current voltage on the basis of the alternating current between the voltage applying part (the development bias supplying part 39) and the developing roller 24, it is possible to maintain the electric field between the photosensitive drum 10 and the developing roller 24 constant and to restrain an uneven density of an image due to a runout of the developing roller 24. Further, in the color printer 1, since the correction switching part 33 sets the direct current voltage correcting part 41 to the non-operating state, even in a case where the alternating current is increased at the time of rise or the like of the alternating current voltage, the direct current voltage is not lowered and it is possible to prevent a delay of the rise of the direct current voltage. Therefore, it is possible to avoid any delay in preparation of the development bias as the superimposed voltage of the alternating current voltage and the direct current voltage, and thereby, to optimize the operating speed. In addition, it is possible to avoid insufficient supply of the toner due to a delay of the rise of the direct current voltage, and thereby, to prevent an image failure. Incidentally, because the alternating current voltage is not stabilized at the target voltage (such as the development alternating current voltage) at the time of rise or the like, even if the direct current voltage correcting part 41 is set to the non-operating state, the alternating current voltage is not used for development or the like, and therefore, no problem is caused.

Further, according to the embodiment, the correction switching part 33 switches the direct current voltage correcting part 41 to the operating state when the alternating current voltage is stabilized at the development alternating current voltage after printing is started. In addition, the correction switching part 33 switches the direct current voltage correcting part 41 to the non-operating state when printing is completed.

In this manner, even if the alternating current voltage constituting the development bias is heightened immediately after printing is started, the direct current voltage correcting part 41 does not lower the direct current voltage and it is possible to prevent a delay of the rise of the direct current voltage at the time of development start. Thus, even immediately after development start, since a sufficient development bias with a high voltage is applied to the developing roller 24, it is possible to supply a sufficient amount of toner to the photosensitive drum 10. Therefore, it is possible to print an appropriate image without thinning of the toner irrespective of the position (for example, the tip end) of the sheet.

Furthermore, according to the embodiment, the correction switching part 33 switches the direct current voltage correcting part 41 to the non-operating state when the operating mode is switched from the printing mode to the cleaning mode at a timing between sheets in continuous printing. In addition, the correction switching part 33 switches the direct current voltage correcting part 41 to the operating state when the alternating current voltage is stabilized at the development alternating current voltage and the alternating current becomes the stabilized current after the operating mode is switched from the cleaning mode to the printing mode.

In this manner, immediately after printing restarted from the cleaning mode, even if the alternating current voltage constituting the development bias is heightened, the direct current voltage correcting part 41 does not lower the direct current voltage and it is possible to prevent a delay of rise of the direct current voltage at the time of development start. Thus, in the same manner as that described above, it is possible to print an appropriate image without thinning of the toner.

Still furthermore, according to the embodiment, the color printer 1 further includes the electric discharge sensing part 42 sensing the electric discharge current produced in the development roller 24 when the superimposed voltage is applied to the developing roller 24 while the alternating current voltage is heightened by the voltage applying part (the alternating current voltage controlling part 35, the alternating current voltage generating part 36, the direct current voltage controlling part 37, the direct current voltage generating part 38 and the development bias supplying part 39) at the time of decision of the development alternating current voltage of the developing roller 24. The correction switching part 33 switches the direct current voltage correcting part 41 to the non-operating state while the alternating current voltage is heightened by the voltage applying part at the time of decision of the development alternating current voltage of the developing roller 24.

In this manner, in a case where the electric discharge sensing part 42 is operated when the optimal development alternating current voltage of the developing roller 24 is decided, since the direct current voltage correcting part 41 is set to the non-operating mode, it is possible to avoid variation of the direct current component of the superimposed voltage applied to the developing roller 24. Thereby, it is possible to prevent mistaken sensing of the electric discharge sensing part 42.

Although the embodiments was described about a case applying the configuration of the present disclosure to the color printer 1, in another different embodiment, the configuration of the present disclosure may be applied to another image forming apparatus, such as a monochrome printer, a copying machine, a facsimile and a multifunction peripheral.

Further, the above-description of the embodiments was described about one example of the image forming apparatus including this. However, the technical scope of the present disclosure is not limited to the embodiments. Components in the embodiment described above can be appropriately exchanged with existing components, and various variations including combinations with other existing components are possible. The description of the embodiment described above does not limit the content of the disclosure described in the claims.

The invention claimed is:

1. An image forming apparatus comprising:
a developing roller supplying a toner to an image carrier;
a voltage applying part applying a superimposed voltage of an alternating current voltage and a direct current voltage to the developing roller;
a direct current voltage correcting part correcting the direct current voltage on the basis of variation of an alternating current flowing between the voltage applying part and the developing roller; and
a correction switching part switching the direct current voltage correcting part between an operating state and a non-operating state,
wherein the correction switching part switches the direct current voltage correcting part to the operating state when the alternating current voltage is stabilized at a development alternating current voltage and the alternating current becomes a stabilized current after a printing start, and, on the other hand, switches the direct current voltage correcting part to the non-operating state when the printing is completed,
the correction switching part switches the direct current voltage correcting part to the non-operating state when an operating mode is switched from a printing mode to a cleaning mode at a timing between sheets in continuous printing, and, on the other hand, switches the direct current voltage correcting part to the operating state when the alternating current voltage is stabilized at the development alternating current voltage and the alternating current becomes the stabilized current after the operating mode is switched from the cleaning mode to the printing mode.

2. The image forming apparatus according to claim 1, further comprising:
an electric discharge sensing part sensing an electric discharge current produced in the developing roller when the superimposed voltage is applied to the developing roller while the alternating current voltage is heightened by the voltage applying part at a time of decision of the development alternating current voltage of the developing roller,
wherein the correction switching part switches the direct current voltage correcting part to the non-operating state while the alternating current voltage is heightened by the voltage applying part at the time of decision of the development alternating current voltage of the developing roller.

3. The image forming apparatus according to claim 2, wherein
the time of decision of the development alternating current voltage of the developing roller is the time when the operating mode the printing mode is switched from a printing mode to a development bias measuring mode.

4. An image forming apparatus comprising:
a developing roller supplying a toner to an image carrier;
a voltage applying part applying a superimposed voltage of an alternating current voltage and a direct current voltage to the developing roller;
a direct current voltage correcting part correcting the direct current voltage on the basis of variation of an alternating current flowing between the voltage applying part and the developing roller; and
a correction switching part switching the direct current voltage correcting part between an operating state and a non-operating state,
wherein the alternating current voltage is generated as a development alternating current voltage when an operating mode is a printing mode, is generated as a cleaning alternating current voltage lower than the development alternating current voltage when the operating mode is a cleaning mode, and is generated as an electric discharge sensing alternating current voltage gradually heightening from a voltage value causing no electric discharge to occur in the developing roller when the operating mode is a development bias measuring mode.

5. An image forming apparatus comprising:
a developing roller supplying a toner to an image carrier;
a voltage applying part applying a superimposed voltage of an alternating current voltage and a direct current voltage to the developing roller;
a direct current voltage correcting part correcting the direct current voltage on the basis of variation of an alternating current flowing between the voltage applying part and the developing roller; and
a correction switching part switching the direct current voltage correcting part between an operating state and a non-operating state,
wherein the direct current voltage correcting part corrects the direct current voltage to be low in a case where an alternating current component of the alternating current is increased, and corrects the direct current voltage to be high in a case where the alternating current component of the alternating current is decreased.

6. An image forming apparatus comprising:
a developing roller supplying a toner to an image carrier;
a voltage applying part applying a superimposed voltage of an alternating current voltage and a direct current voltage to the developing roller;
a direct current voltage correcting part correcting the direct current voltage on the basis of variation of an alternating current flowing between the voltage applying part and the developing roller; and
a correction switching part switching the direct current voltage correcting part between an operating state and a non-operating state,
wherein the alternating current voltage is generated as a development alternating current voltage when an operating mode is a printing mode, is generated as a cleaning alternating current voltage lower than the development alternating current voltage when the operating mode is a cleaning mode, and is generated as an electric discharge sensing alternating current voltage gradually heightening from a voltage value causing no electric discharge to occur in the developing roller when the operating mode is a development bias measuring mode,
the direct current voltage correcting part corrects the direct current voltage to be low in a case where an alternating current component of the alternating current is increased, and corrects the direct current voltage to be high in a case where the alternating current component of the alternating current is decreased.

* * * * *